United States Patent
Noridomi et al.

(10) Patent No.: US 7,356,700 B2
(45) Date of Patent: Apr. 8, 2008

(54) DIGITAL WATERMARK-EMBEDDING APPARATUS AND METHOD, DIGITAL WATERMARK-DETECTING APPARATUS AND METHOD, AND RECORDING MEDIUM

(75) Inventors: Kenichi Noridomi, Fukuoka (JP); Hisashi Inoue, Fukuoka (JP); Takashi Katsura, Fukuoka (JP); Masataka Ejima, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 880 days.

(21) Appl. No.: 10/654,492

(22) Filed: Sep. 4, 2003

(65) Prior Publication Data

US 2004/0093498 A1 May 13, 2004

(30) Foreign Application Priority Data

Sep. 4, 2002 (JP) ............................. 2002-258525
Oct. 10, 2002 (JP) ............................. 2002-297288

(51) Int. Cl.
*H04L 9/00* (2006.01)
*G06K 9/46* (2006.01)
(52) U.S. Cl. ...................................... 713/176; 382/190
(58) Field of Classification Search ................ 382/191, 382/192
See application file for complete search history.

(56) References Cited

U.S. PATENT DOCUMENTS

| 6,735,325 B2* | 5/2004 | Wakasu ...................... 382/100 |
|---|---|---|
| 6,873,711 B1* | 3/2005 | Murakami et al. ........... 382/100 |
| 2002/0006203 A1* | 1/2002 | Tachibana et al. ........... 380/269 |
| 2002/0085737 A1* | 7/2002 | Kitamura .................... 382/100 |
| 2002/0114488 A1* | 8/2002 | Suda .......................... 382/100 |
| 2005/0100190 A1* | 5/2005 | Sakazawa et al. ........... 382/100 |

FOREIGN PATENT DOCUMENTS

| EP | 1 030 511 | 8/2000 |
|---|---|---|
| JP | 11-75166 | 3/1999 |
| JP | 2000-175161 | 6/2000 |

OTHER PUBLICATIONS

Minoru Kuribayashi et al., "A Watermarking Scheme Based on the Characteristic of Addition among DCT Coefficients", ISW 2000, LNCS 1975, pp. 1-14, 2000.
Tae-Yun Chung et al., "Digital Watermarking for Copyright Protection of MPEG2 Compressed Video", IEEE Transactions on Consumer Electronics, IEEE USA, vol. 44, No. 3, Aug. 1998 , pp. 895-901.

(Continued)

*Primary Examiner*—Matthew B Smithers
(74) *Attorney, Agent, or Firm*—Wenderoth, Lind & Ponack, L.L.P.

(57) ABSTRACT

A digital image signal is divided into blocks. Each of the divided blocks is subjected to orthogonal transformation. As a result, the divided blocks are transformed into several frequency components. One or more frequency components are selected in accordance with a characteristic amount that is extracted from the several frequency components. Values of the selected frequency components are operated under a predetermined rule in accordance with an embedment signal that is generated from embedment information.

20 Claims, 16 Drawing Sheets

OTHER PUBLICATIONS

S. P. Mohanty et al., "A DCT Domain Visible Watermarking Technique for Images", Multimedia and Expo, 2000, ICME 2000,. 2000 IEEE International Conference on New York, NY, USA, vol. 2, Jul. 30, 2000, pp. 1029-1032.

Chiou-Ting Hsu et al., "Hidden Digital Watermarks in Images", IEEE Transactions on Image Processing IEEE USA, vol. 8, No. 1, Jan. 1999, pp. 58-68.

Dug-Ryung Kim et al., "A Robust Video Watermarking Method", Multimedia and Expo, 2000, ICME 2000, 2000 IEEE International Conference on New York, NY, USA Jul. 30-Aug. 2, 2000, Piscataway, NJ, USA, IEEE, US, vol. 2, Jul. 30, 2000, pp. 763-766.

H. Choi et al., "Rubust Sinusoidal Watermark for Images", Electronics Letters, IEE Stevenage, GB, vol. 35, No. 15, Jul. 22, 1999, pp. 1238-1239.

* cited by examiner

Fig. 5(a) operation
$AC1 += dx \longrightarrow$
Fig. 5(b) transformation
| 3 | 3 | 3 | 3 | 3 | 3 | 3 | 3 |
|---|---|---|---|---|---|---|---|
| 2 | 2 | 2 | 2 | 2 | 2 | 2 | 2 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| -1 | -1 | -1 | -1 | -1 | -1 | -1 | -1 |
| -2 | -2 | -2 | -2 | -2 | -2 | -2 | -2 |
| -3 | -3 | -3 | -3 | -3 | -3 | -3 | -3 |
Fig. 5(c) transformed distribution
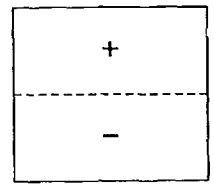
Fig. 5(d)
$AC2 += dx \longrightarrow$
Fig. 5(e)
| 3 | 2 | 1 | 0 | 0 | -1 | -2 | -3 |
|---|---|---|---|---|---|---|---|
| 3 | 2 | 1 | 0 | 0 | -1 | -2 | -3 |
| 3 | 2 | 1 | 0 | 0 | -1 | -2 | -3 |
| 3 | 2 | 1 | 0 | 0 | -1 | -2 | -3 |
| 3 | 2 | 1 | 0 | 0 | -1 | -2 | -3 |
| 3 | 2 | 1 | 0 | 0 | -1 | -2 | -3 |
| 3 | 2 | 1 | 0 | 0 | -1 | -2 | -3 |
| 3 | 2 | 1 | 0 | 0 | -1 | -2 | -3 |
Fig. 5(f)
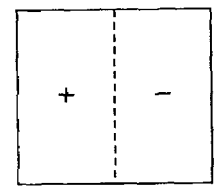
Fig. 5(g)
$AC1 += dx$
and
$AC2 += dx$
$\longrightarrow$
Fig. 5(h)
| 6 | 5 | 4 | 3 | 3 | 2 | 1 | 0 |
|---|---|---|---|---|---|---|---|
| 5 | 4 | 3 | 2 | 2 | 1 | 0 | -1 |
| 4 | 3 | 2 | 1 | 1 | 0 | -1 | -2 |
| 3 | 2 | 1 | 0 | 0 | -1 | -2 | -3 |
| 3 | 2 | 1 | 0 | 0 | -1 | -2 | -3 |
| 2 | 1 | 0 | -1 | -1 | -2 | -3 | -4 |
| 1 | 0 | -1 | -2 | -2 | -3 | -4 | -5 |
| 0 | -1 | -2 | -3 | -3 | -4 | -5 | -6 |
Fig. 5(i)
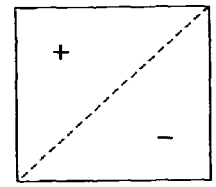
Fig. 5(j)
$AC1 -= dx$
and
$AC2 += dx$
$\longrightarrow$
Fig. 5(k)
| 0 | 1 | 2 | 3 | 3 | 4 | 5 | 6 |
|---|---|---|---|---|---|---|---|
| -1 | 0 | 1 | 2 | 2 | 3 | 4 | 5 |
| -2 | -1 | 0 | 1 | 1 | 2 | 3 | 4 |
| -3 | -2 | -1 | 0 | 0 | 1 | 2 | 3 |
| -3 | -2 | -1 | 0 | 0 | 1 | 2 | 3 |
| -4 | -3 | -2 | -1 | -1 | 0 | 1 | 2 |
| -5 | -4 | -3 | -2 | -2 | -1 | 0 | 1 |
| -6 | -5 | -4 | -3 | -3 | -2 | -1 | 0 |
Fig. 5(l)
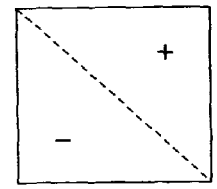

Fig. 6(a)
AC5+=dx →
Fig. 6(b)
| 3 | 1 | -1 | -3 | -3 | -1 | 1 | 3 |
|---|---|----|----|----|----|---|---|
| 3 | 1 | -1 | -3 | -3 | -1 | 1 | 3 |
| 3 | 1 | -1 | -3 | -3 | -1 | 1 | 3 |
| 3 | 1 | -1 | -3 | -3 | -1 | 1 | 3 |
| 3 | 1 | -1 | -3 | -3 | -1 | 1 | 3 |
| 3 | 1 | -1 | -3 | -3 | -1 | 1 | 3 |
| 3 | 1 | -1 | -3 | -3 | -1 | 1 | 3 |
| 3 | 1 | -1 | -3 | -3 | -1 | 1 | 3 |
Fig. 6(c)
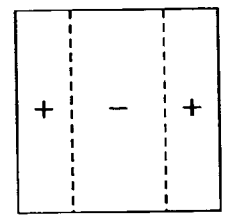
Fig. 6(d)
AC3+=dx →
Fig. 6(e)
| 3 | 3 | 3 | 3 | 3 | 3 | 3 | 3 |
|---|---|---|---|---|---|---|---|
| 1 | 1 | 1 | 1 | 1 | 1 | 1 | 1 |
| -1 | -1 | -1 | -1 | -1 | -1 | -1 | -1 |
| -3 | -3 | -3 | -3 | -3 | -3 | -3 | -3 |
| -3 | -3 | -3 | -3 | -3 | -3 | -3 | -3 |
| -1 | -1 | -1 | -1 | -1 | -1 | -1 | -1 |
| 1 | 1 | 1 | 1 | 1 | 1 | 1 | 1 |
| 3 | 3 | 3 | 3 | 3 | 3 | 3 | 3 |
Fig. 6(f)
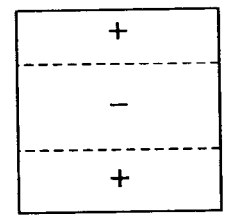
Fig. 6(g)
AC1+=dx
and
AC3+=dx →
Fig. 6(h)
| 6 | 5 | 4 | 3 | 3 | 2 | 1 | 0 |
|---|---|---|---|---|---|---|---|
| 4 | 3 | 2 | 1 | 1 | 0 | -1 | -2 |
| 2 | 1 | 0 | -1 | -1 | -2 | -3 | -4 |
| 0 | -1 | -2 | -3 | -3 | -4 | -5 | -6 |
| 0 | -1 | -2 | -3 | -3 | -4 | -5 | -6 |
| 2 | 1 | 0 | -1 | -1 | -2 | -3 | -4 |
| 4 | 3 | 2 | 1 | 1 | 0 | -1 | -2 |
| 6 | 5 | 4 | 3 | 3 | 2 | 1 | 0 |
Fig. 6(i)
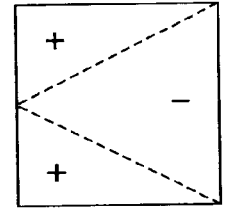
Fig. 6(j)
AC5+=dx
and
AC2+=dx →
Fig. 6(k)
| 6 | 4 | 2 | 0 | 0 | 2 | 4 | 6 |
|---|---|---|---|---|---|---|---|
| 5 | 3 | 1 | -1 | -1 | 1 | 3 | 5 |
| 4 | 2 | 0 | -2 | -2 | 0 | 2 | 4 |
| 3 | 1 | -1 | -3 | -3 | -1 | 1 | 3 |
| 3 | 1 | -1 | -3 | -3 | -1 | 1 | 3 |
| 2 | 0 | -2 | -4 | -4 | -2 | 0 | 2 |
| 1 | -1 | -3 | -5 | -5 | -3 | -1 | 1 |
| 0 | -2 | -4 | -6 | -6 | -4 | -2 | 0 |
Fig. 6(l)
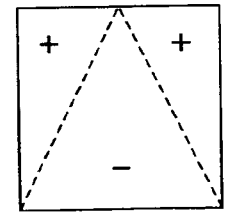

Fig. 7(a)
AC5+=dx
and
AC3+=dx
→
Fig. 7(b)
| 6 | 4 | 2 | 0 | 0 | 2 | 4 | 6 |
| 4 | 2 | 0 | -2 | -2 | 0 | 2 | 4 |
| 2 | 0 | -2 | -4 | -4 | -2 | 0 | 2 |
| 0 | -2 | -4 | -6 | -6 | -4 | -2 | 0 |
| 0 | -2 | -4 | -6 | -6 | -4 | -2 | 0 |
| 2 | 0 | -2 | -4 | -4 | -2 | 0 | 2 |
| 4 | 2 | 0 | -2 | -2 | 0 | 2 | 4 |
| 6 | 4 | 2 | 0 | 0 | 2 | 4 | 6 |
Fig. 7(c)
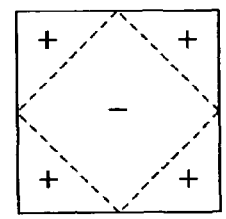
Fig. 7(d)
AC1-=dx
and
AC3+=dx
→
Fig. 7(e)
| 0 | 1 | 2 | 3 | 3 | 4 | 5 | 6 |
| -2 | -1 | 0 | 1 | 1 | 2 | 3 | 4 |
| -4 | -3 | -2 | -1 | -1 | 0 | 1 | 2 |
| -6 | -5 | -4 | -3 | -3 | -2 | -1 | 0 |
| -6 | -5 | -4 | -3 | -3 | -2 | -1 | 0 |
| -4 | -3 | -2 | -1 | -1 | 0 | 1 | 2 |
| -2 | -1 | 0 | 1 | 1 | 2 | 3 | 4 |
| 0 | 1 | 2 | 3 | 3 | 4 | 5 | 6 |
Fig. 7(f)
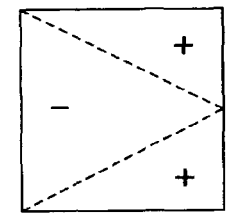
Fig. 7(g)
AC3-=dx
and
AC2+=dx
→
Fig. 7(h)
| 0 | 2 | 4 | 6 | 6 | 4 | 2 | 0 |
| -1 | 1 | 3 | 5 | 5 | 3 | 1 | -1 |
| -2 | 0 | 2 | 4 | 4 | 2 | 0 | -2 |
| -3 | -1 | 1 | 3 | 3 | 1 | -1 | -3 |
| -3 | -1 | 1 | 3 | 3 | 1 | -1 | -3 |
| -4 | -2 | 0 | 2 | 2 | 0 | -2 | -4 |
| -5 | -3 | -1 | 1 | 1 | -1 | -3 | -5 |
| -6 | -4 | -2 | 0 | 0 | -2 | -4 | -6 |
Fig. 7(i)
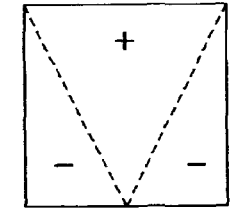

: blocks for embedding

: neighboring block

Fig. 14(a)

bit string

| 0 | 0 | 0 | 0 | 0 | 0 | 1 | 0 | 1 | 1 | 0 | 0 | 1 | 0 | 1 | 1 | bit position: 0 1 2 3 4 5 6 7 8 9 10 11 12 13 14 15

Fig. 14(b)

| bit position | value | pseudo-random number sequence |
|---|---|---|
| 0 | 0 | S000 |
|   | 1 | S001 |
| 1 | 0 | S010 |
|   | 1 | S011 |
| ⋮ | ⋮ | ⋮ |
| 15 | 0 | S150 |
|   | 1 | S151 |

DIGITAL WATERMARK-EMBEDDING APPARATUS AND METHOD, DIGITAL WATERMARK-DETECTING APPARATUS AND METHOD, AND RECORDING MEDIUM

BACKGROUND OF THE INVENTION

1. Field of the Invention

The present invention relates to an apparatus and method for embedding embedment information as digital watermarks into an image signal, an apparatus and method for detecting the digital watermarks from the image signal, and a medium having a program recorded therein for practicing each of the above methods.

2. Description of the Related Art

In recent years, digital content such as digitized audio and digitized video data has been on the increase. The digital content makes it easy to provide a faithful reproduction of original content. Therefore, it is an important issue to protect the copyright of the digital content. Illegally reproduced or distributed content is very difficult to differentiate from corresponding original content. This fact involves difficulties in demonstrating an evidence to assert the copyright of the content. As a result, efforts have been made to protect the copyright of the digital content.

A "digital watermark" is used as one of the efforts. The digital watermark is an art of embedding data into the video data without allowing human beings to perceive degradation in image quality, and further of detecting the embedded data from the image data having the embedded data embedded therein.

A prior art digital watermark-embedding apparatus of the type discussed above has been disclosed in, e.g., published Japanese Patent Application Laid-Open No. 2000-175161 (patent reference No. 1).

This prior art is now described with reference to FIG. 18. FIG. 18 is a block diagram illustrating the prior art digital watermark-embedding apparatus.

In FIG. 18, a block-dividing unit 1401 divides a moving image frame (image data) into blocks, while a block-extracting unit 1402 extracts one of the blocks, which is designated by a template 1409.

A DCT unit 1403 practices the DCT processing of the extracted block. A DCT coefficient-extracting unit 1404 extracts a DCT coefficient designated by the template 1409. A watermark data-embedding unit 1405 increases an absolute value of a DCT coefficient value, and then embeds watermark data into the DCT coefficient value.

An inverse DCT unit 1406 performs the inverse DCT of the DCT coefficient value having the watermark embedded therein, and then feeds a block image into a block-combining unit 1407. The block-combining unit 1407 combines the block images together, thereby generating one-frame image data. The block-combining unit 1407 feeds the one-frame image data into an MPEG-encoding unit 1408.

The MPEG-encoding unit 1408 encodes the image data, and then outputs compressed image data. For example, an image database server delivers the compressed image data to a client.

However, the prior art requires the above-mentioned processes of DCT, inverse DCT, and MPEG-encoding in order to distribute the compressed image data having the digital watermarks embedded therein.

The embedded watermark data is detected in a manner as discussed below.

An absolute value of a DCT coefficient value of a block having watermark data embedded therein is compared with an absolute average value of a corresponding DCT coefficient value of a neighboring block. When the absolute value of the former DCT coefficient value differs from the absolute average value of the latter DCT coefficient value by an amount equal or greater than a scheduled threshold value, then it is detected that the watermark data have been embedded.

As a result, the embedded watermark data are difficult to detect when a block to be detected and its neighboring blocks have greatly different image complexities. For example, a flat image results in a DCT coefficient having a reduced amount of an alternating current component value. An image abundant with edges causes a DCT coefficient having an increased amount of alternating current component. According to the process as taught by patent reference No. 1, these different images intermingled in both of the block to be detected and the neighboring blocks bring about a problem of poor detective precision.

According to the process of patent reference No. 1, a template is used to determine a block where digital watermarks are embedded. This step may degrade image quality, depending on the complexity of a corresponding image of the determined block. For example, when the block determined by the template is a flat image, then digital watermark embedment results in deteriorated image quality.

Such a digital watermark-embedding method is taught in published Japanese Patent Application Laid-Open No. 11-75166 (patent reference No. 2). Patent reference No. 2 discloses a method for superposing a micro level of additional information on a several-pixel basis of a video signal.

According to patent reference No. 2, a superposing level of additional information within on a several-pixel basis is varied to permit a superposing level pattern within on the several-pixel basis to coincide with a predetermined invariable pattern, thereby superposing the additional information onto a video signal.

According to patent reference No. 2, each pixel on a pixel domain is minutely varied to embed digital watermarks, with the result of an increased amount of processing. For example, in order to embed the digital watermarks into an originally MPEG-encoded video, extension must be at first made to the pixel domain before re-encoding is carried out after the digital watermark embedment. This means that patent reference No. 2 is improper for real-time processing.

OBJECTS AND SUMMARY OF THE INVENTION

A first object of the present invention is to provide a digital-watermarking art immune to a block image and having high-detective precision.

A second object of the present invention is to provide a digital-watermarking art for suppressing degradation in image quality.

A third object of the present invention is to provide a digital-watermarking art that requires a small amount of processing, and that has a high affinity for standard image-encoding represented by MPEG-encoding.

A first aspect of the present invention selects one or more frequency components on the basis of a first characteristic amount extracted from several frequency components, and operates values of the selected one or more frequency components under a predetermined rule in accordance with a second characteristic amount.

This feature suppresses degradation in image quality, and requires a small amount of processing.

A second aspect of the present invention operates, under a predetermined rule, values of one or more frequency components that have experienced discrete cosine transform.

This feature realizes digital watermark embedment that has a high affinity for standard image-encoding represented by MPEG-encoding using the discrete cosine transform.

A third aspect of the present invention performs calculations after selecting a region having a high level of digital watermark embedment-caused variations, and a neighboring region adjacent to the former region and having pixels close in value to those of the former region.

This feature operatively extracts only digital watermark embedment-caused variations, and realizes a digital-watermarking art having high-detective precision and immune to a block image.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 5 (a), (d), (g), and (j) illustrate operations according to the first embodiment;

FIGS. 5 (b), (e), (h), and (k) illustrate amounts of variations in luminance according to the first embodiment;

FIGS. 5 (c), (f), (i), and (l) illustrate distributions of the variations in luminance according to the first embodiment;

FIGS. 6 (a), (d), (g), and (j) illustrate operations according to the first embodiment;

FIGS. 6 (b), (e), (h), and (k) illustrate amounts of variations in luminance according to the first embodiment;

FIGS. 6 (c), (f), (i), and (l) illustrate distributions of the variations in luminance according to the first embodiment;

FIGS. 7 (a), (d), and (g) illustrate operations according to the first embodiment;

FIGS. 7 (b), (e), and (h) illustrate amounts of variations in luminance according to the first embodiment;

FIGS. 7 (c), (f), and (i) illustrate distributions of the variations in luminance according to the first embodiment;

FIG. 14 (a) illustrates a bit string according to a third embodiment;

FIG. 14 (b) illustrates pseudo-random number sequences according to the third embodiment;

DETAILED DESCRIPTION OF THE PREFERRED EMBODIMENTS

Embodiments of the present invention will now be described with reference to the accompanying drawings.

First Embodiment

Figure 1:
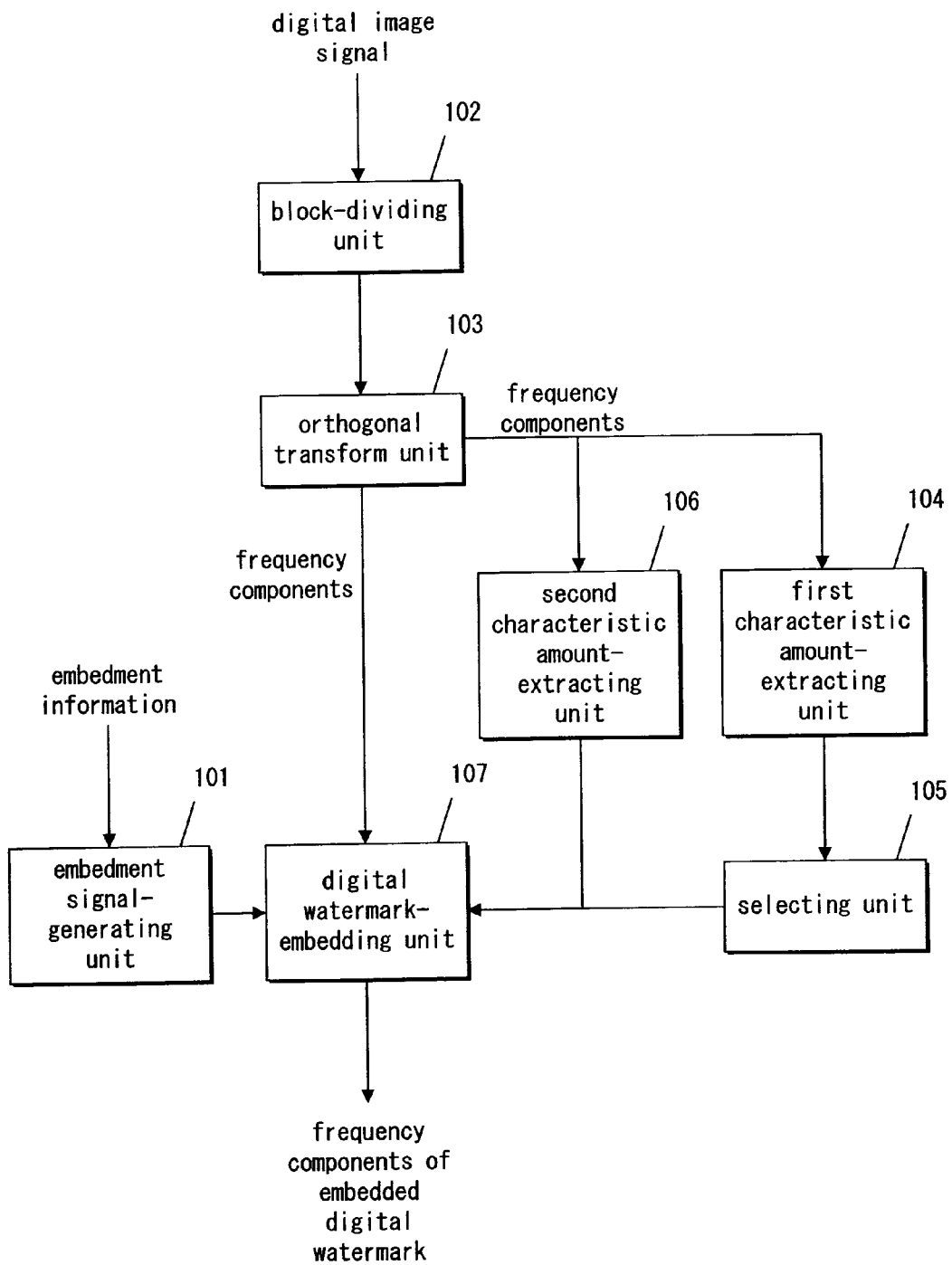
FIG. 1 is a block diagram illustrating a digital watermark-embedding apparatus according to a first embodiment of the present invention.

FIG. 1 is a block diagram illustrating a digital watermark-embedding apparatus according to a first embodiment.

As seen from FIG. 1, the digital watermark-embedding apparatus comprises an embedment signal-generating unit 101, a block-diving unit 102, an orthogonal transform unit 103, a first characteristic amount-extracting unit 104, a selecting unit 105, and a second characteristic amount-extracting unit 106, and a digital watermark-embedding unit 107.

The embedment signal-generating unit 101 generates, on the basis of embedment information, a signal to be embedded as a digital watermark. The block-dividing unit 102 divides a digital image signal into blocks that are formed by several pixels.

The orthogonal transform unit 103 practices the orthogonal transformation of the blocks, thereby transforming the blocks into frequency components. The digital watermark-embedding unit 107 operates a value of at least one of the frequency components under a predetermined rule in accordance with the embedment signal from the embedment signal-generating unit 101. In consideration of detection, the value of at least one of the frequency components is operated in such a manner that amounts of variations in image within the blocks follow a predetermined pattern.

The first characteristic amount-extracting unit 104 extracts a first characteristic amount on the basis of the frequency components.

The selecting unit 105 selects a value of at least one of the frequency components on the basis of the extracted first characteristic amount.

Figure 2:
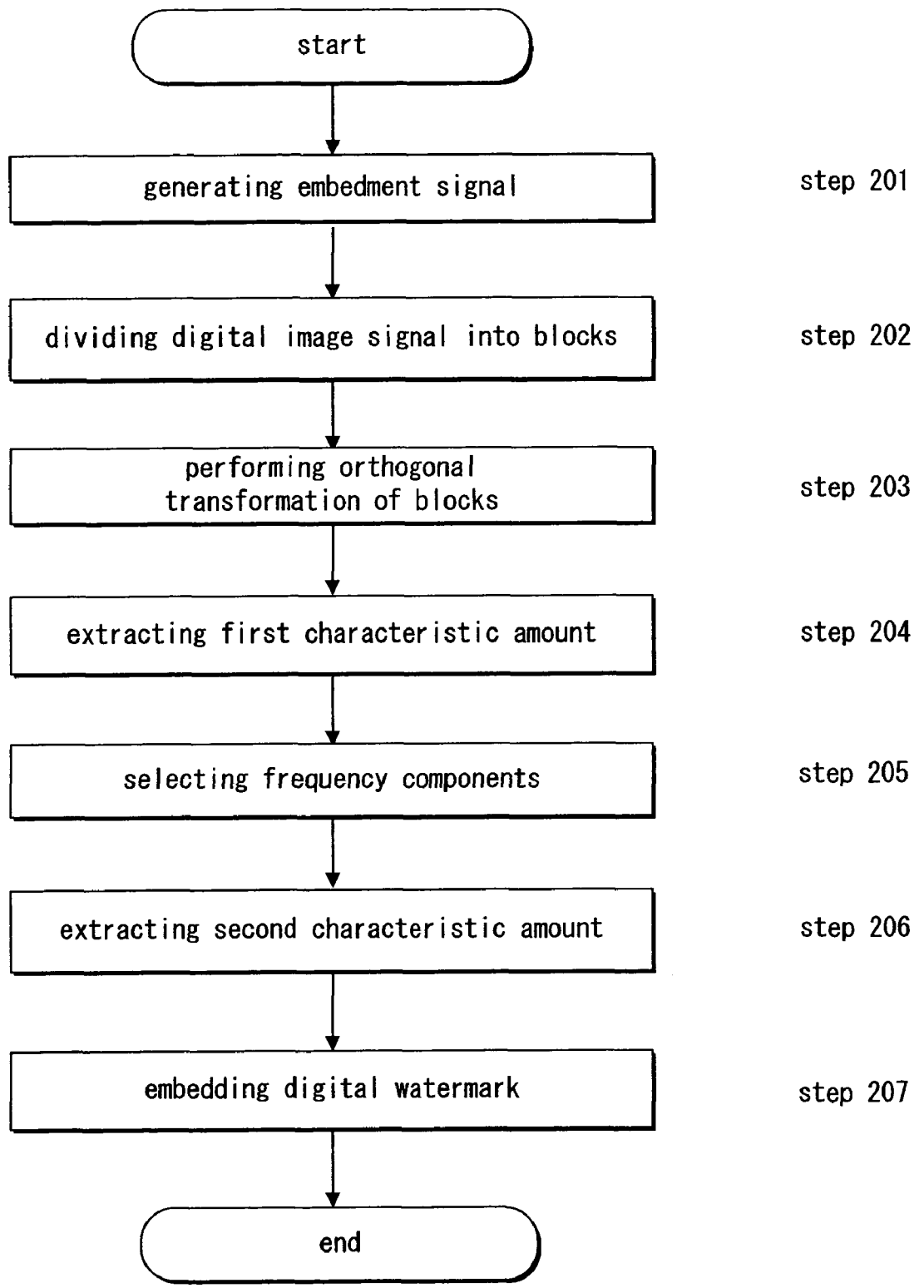
FIG. 2 is a flowchart illustrating how the digital watermark-embedding apparatus behaves.

The digital watermark-embedding apparatus according to the present invention is further discussed with reference to FIG. 2. FIG. 2 is a flowchart illustrating how the digital watermark-embedding apparatus of FIG. 1 behaves.

At step 201, the embedment signal-generating unit 101 transforms embedment information into a binary bit string.

For example, when 16-bit identification information "715" is embedded as embedment information, the embedment signal-generating unit 101 transforms embedment information "715" into "0000001011001011" as expressed by the binary bit string.

At step 202, the block-dividing unit 102 divides a digital image signal into blocks formed by several pixels. Pursuant to the present embodiment, the divided blocks are eight-by-eight pixels. Such blocks have a high affinity for a MPEG system.

At step 203, the orthogonal transform unit 103 performs orthogonal transformation of the blocks divided at step 202, thereby transforming the blocks into frequency components. Pursuant to the present embodiment, the orthogonal transform unit 103 performs discrete cosine transform.

At step 204, the first characteristic amount-extracting unit 104 extracts a first characteristic amount from the frequency components transformed at step 203.

Pursuant to the present embodiment, the first characteristic amount is a total of specific frequency components that correspond to vertical and horizontal edges in an image within the blocks.

Figure 3:
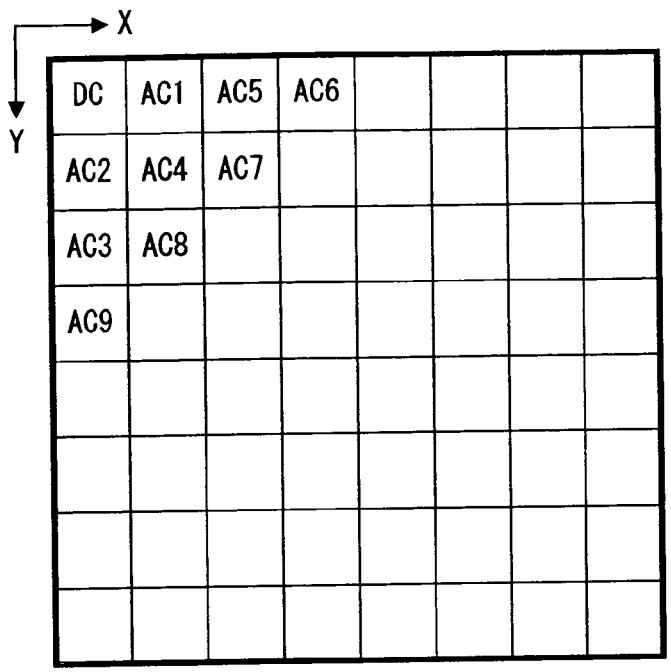
FIG. 3 is a descriptive illustration showing frequency components according to the first embodiment.

The first characteristic amount is further described with reference to FIG. 3. In FIG. 3, each rectangle is a block that has experienced the discrete cosine transform at step 203. Each of the rectangles corresponds to one of the frequency components.

In FIG. 3, assume that a total of specific frequency components corresponding to the vertical edges are sumV, and that sumV is a total of absolute values of frequency components AC1, AC5, and AC6. Further assume that a total of specific frequency component corresponding to the horizontal edges is sumH, and that sumH is a total of absolute values of frequency components AC2, AC3, and AC9.

In the block image, a value of sumV increases according to the strength of vertical edge components. As a result, sumV serves as an index of the strength of the vertical edge components. Meanwhile, sumH serves as an index of the strength of horizontal edge components.

At step 205, the selecting unit 105 select one or more frequency components on the basis of the first characteristic amount extracted at step 204.

Pursuant to the present embodiment, the frequency components are selected according to conditions as discussed below, where "R" is a predetermined threshold.

Condition "a": frequency component "AC1" in FIG. 3 is selected with sumV>R and sumH≦R;

Condition "b": frequency component "AC2" in FIG. 3 is selected with sumH>R and sumV≦R;

Conditions "c": frequency components "AC1" and "AC2" in FIG. 3 are selected when neither condition "a" nor condition "b" is applicable.

At step 206, the second characteristic amount-extracting unit 106 extracts a second characteristic amount from the digital image signal that is designated by the frequency components transformed at step 203.

Pursuant to the present embodiment, the second characteristic amount is a direct current component value plus a total of specific alternating current component values. In FIG. 3, the direct current component value is a value of frequency component "DC", while the total of specific alternating current component values is a total of values of frequency components "AC1" to "AC9".

The direct current component value "DC" designates a luminance average value of pixels in the blocks. The total of specific alternating current component values "AC1" to "AC9" increases in value according to the complexity of the block image, and thus serves as an index of complexity.

At step 207, the digital watermark-embedding unit 107 allocates a value of the bit string (generated at step 201) to each of the blocks, and then fluctuates values of one or more frequency components (selected at step 205) on the basis of the second characteristic amount extracted at step 206, thereby embedding digital watermarks into the frequency components.

Figure 4:
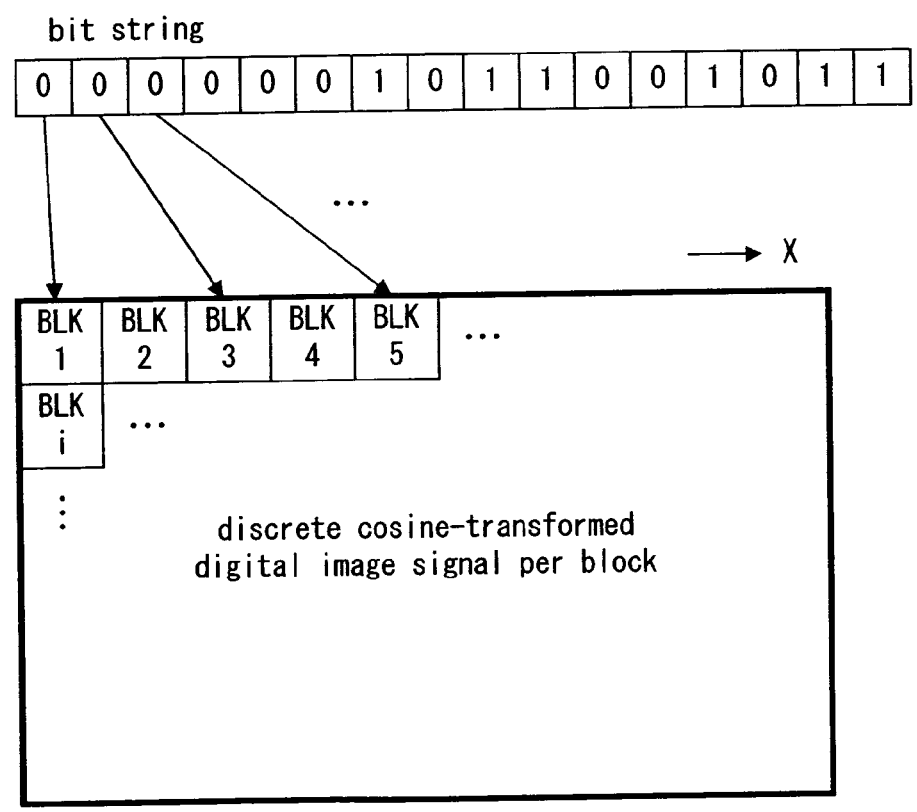
FIG. 4 is a descriptive illustration showing an embedment step according to the first embodiment.

FIG. 4 shows how the bit string is allocated to each of the blocks. According to the present embodiment, as shown in FIG. 4, a value of the bit string is repeatedly allocated to every other block.

Assume that a frequency component to be fluctuated has original value "Xorg" and fluctuation value "dX". Assume that a fluctuated frequency component has value "Xwm".

Assume that the fluctuated frequency component has value "Xwm" equal to "Xorg"+"dX" ("Xwm"="Xorg"+ "dX") when value "1" of the bit string is allocated.

Assume that the fluctuated frequency component has value "Xwm" equal to "Xorg"−"dX" ("Xwm"="Xorg"− "dX") when value "0" of the bit string is allocated.

Fluctuation value "dX" is a positive value, and fluctuates with respect to a reference value in accordance with the direct current component value and the specific alternating current component values. Direct current component "DC" responds with the luminance average value. Accordingly, fluctuation value "dX" is desirably increased when the direct current component "DC" assumes a value at which visual characteristics of human beings are difficult to perceive variations, but fluctuation value "dX" is preferably reduced when the direct current component "DC" assumes a value at which the visual characteristics of the human beings can easily perceive the variations.

An increased total of specific alternating current component values "AC1" to "AC9" brings about a complicated image that is abundant with edge components. As a result, it is difficult to perceive the variations. Conversely, a reduced total of specific alternating current component values "AC1" to "AC9" results in a flat image, and it is easy to perceive the variations.

Accordingly, fluctuation value "dX" is desirably increased with an increase in total of the specific alternating current component values, but is desirably decreased with a decrease in total thereof. The digital watermark-embedding unit 107 provides such control over values of the frequency components selected at step 205.

Referring to the frequency components having digital watermarks embedded therein as described above, a pixel value on a pixel domain is minutely varied for each of the blocks. An amount of such a variation is represented by either a single pattern of a basic image in discrete cosine transform or a combination of several patterns.

FIGS. 5 to 7 illustrate variations in luminance values in the blocks having the digital watermarks embedded therein.

FIGS. 5 (a), (d), (g), (j), FIGS. 6 (a), (d), (g), (j), and FIGS. 7 (a), (d), and (g) illustrate operations by which the digital watermarks are embedded.

FIGS. 5 (b), (e), (h), (k), FIGS. 6 (b), (e), (h), (k), and FIGS. 7 (b), (e), and (h) illustrate distribution (specific patterns) of amounts of variations in luminance.

FIGS. 5 (c), (f), (i), (l), FIGS. 6 (c), (f), (i), (l), and FIGS. 7 (c), (f), and (i) schematically illustrate the above distribution using positive and negative sings.

FIGS. 5 (a), (b), and (c) illustrate step 205 where condition "b" is fulfilled. Similarly, FIGS. 5 (d), (e), and (f) illustrate step 205 where condition "a" is met. FIGS. 5 (g), (h), and (i) illustrate step 205 where condition "c" is met.

In addition to conditions "a", "b", and "c", conditions as shown in FIG. 5 (j) to 5(l), FIG. 6, and FIG. 7 may be established to embed the digital watermarks into the frequency components.

At any rate, as illustrated in FIGS. 5 (c), (f), (i), (l), FIGS. 6 (c), (f), (i), (l), and FIGS. 7 (c), (f), and (i), the specific patterns are regularly formed in such a manner that each region having a positive amount of image variations and each region having a negative amount of image variations are arranged in alternating sequence. Such specific patterns provide regular amounts of variations in luminance in response to the embedment of the digital watermarks. Such regularity facilitates detecting the digital watermarks, and further avoids missing the digital watermarks.

The digital watermark-embedding apparatus according to the present embodiment selects one or more frequency components on the basis of the first characteristic amount that has been extracted from several frequency components, and then operates values of the selected one or more frequency components under a predetermined rule on the basis of the second characteristic amount. This feature suppresses degradation in image quality.

The digital watermark-embedding apparatus according to the present embodiment requires a small amount of processing, and further operates values of one or more discrete cosine-transformed frequency components under a predetermined rule. This feature realizes digital watermark embedment having a high affinity for standard image-encoding represented by MPEG-encoding using discrete cosine transform.

Pursuant to the present embodiment, embedment information is transformed into a binary bit string at step 201. However, the present invention is not limited thereto.

Pursuant to the present embodiment, the digital image signal is divided at step 202 into the blocks formed by eight-by-eight pixels. However, the present invention is not limited thereto. Alternative blocks formed by four-by-four pixels may be employed.

Pursuant to the present embodiment, the discrete cosine transform is used as orthogonal transformation at step 203. However, the present invention is not limited thereto. Alternatively, any other transform may be used as long as it is an orthogonal transformation. For example, wavelet transform is acceptable.

Pursuant to the present embodiment, a total of specific frequency components corresponding to vertical and horizontal edges are used as the first characteristic amount at step 204. However, the present invention is not limited thereto. Alternatively, examples as illustrated in FIGS. 5 to 7 or others may be used.

As a further alternative, specific frequency components corresponding to slanted edges may be used. An extracted characteristic amount suited for visual characteristics of human beings operatively makes it difficult to perceive degradation in image quality.

Pursuant to the present embodiment, a characteristic amount of an embedment block is extracted at step 204. Alternatively, in addition to the characteristic amount of the embedment block, characteristic amounts of blocks (hereinafter called neighboring blocks) adjacent to the embedment block may also be extracted. In this case, at step 205, one or more frequency components may be selected on the basis of the characteristic amount of the embedment block and the characteristic amounts of the neighboring blocks. This alternative step is effective in further inhibiting the degradation in image quality.

For example, there is available an alternative method in which a determination may be made at step 205 to see how conditions "a" to "c" are applicable to the embedment block and the neighboring blocks, with the result that the condition to be applicable to the embedment block is decided by majority.

Figure 8:
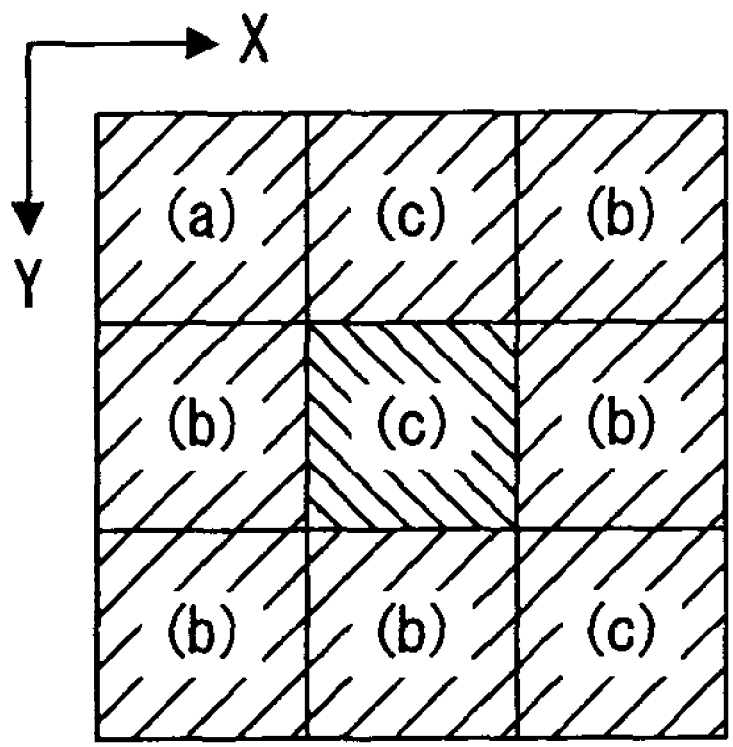
FIG. 8 illustrates a positional relationship between blocks according to the first embodiment.
Figure 8:
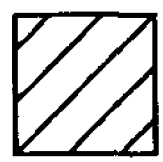
Figure 8:
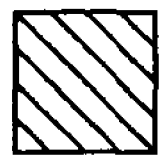

FIG. 8 illustrates the embedment block and the neighboring blocks. In FIG. 8, symbols "a", "b", and "c" in the blocks denote conditions "a", "b", and "c", respectively. This means that the block designed by, e.g., "a" is applicable to condition "a".

As seen from FIG. 8, the embedment block is applicable to condition "c". At the same time, the blocks applicable to condition "b" including the neighboring blocks are the greatest in number. In this case, the embedment block may alternatively be applicable to condition "b" as majority decision.

Pursuant to the present embodiment, frequency component "AC1" or "AC2", or both of them are selected at step 205 on the basis of the first characteristic amount. However, the present invention is not limited thereto. It is desirable to select a frequency component such that the selected frequency component is closer to an image pattern illustrated by the first characteristic amount, when the selected frequency component is operated under a predetermined rule.

Pursuant to the present embodiment, direct current component value "DC" and a total of specific alternating current components "AC1" to "AC9" are used as the second characteristic amount at step 206. However, the present invention is not limited thereto. Alternatively, a characteristic amount adapted for visual characteristics of human beings may be extracted. Such an extracted characteristic amount effectively makes it difficult to perceive degradation in image quality.

Pursuant to the present embodiment, each value of a bit string is repeatedly allocated to every other block at step 207. However, the present invention is not limited thereto as long as a value of the bit string is allocated regularly to each block. In this case, all that is required is that the digital watermark-embedding apparatus and a digital watermark-detecting apparatus share such an allocation method.

Pursuant to the present embodiment, a fluctuated frequency component has value "Xwm" equal to "Xorg"+"dX" when an allocated value of the bit string is "1", but the fluctuated frequency component has value "Xwm" equal to "Xorg"−"dX" when an allocated value of the bit string is "0". However, the use of "dX" having contrary signs provides similar effects. Pursuant to the present embodiment, the value of the frequency component is operated under a predetermined rule to fluctuate the frequency component value. However, such a fluctuation is only an example of the operation under the predetermined rule.

Pursuant to the present embodiment, a digital image signal is divided into blocks, each of which is then subjected to orthogonal transformation. Thereafter, one or more frequency component values are operated in a predetermined manner, thereby embedding digital watermarks into the frequency components. Alternatively, an MPEG stream, e.g., may be decoded to a level at which one or more frequency component values denote the MPEG stream, thereby embedding the digital watermarks into the frequency components. This alternative step provides similar beneficial effects.

Figure 9:
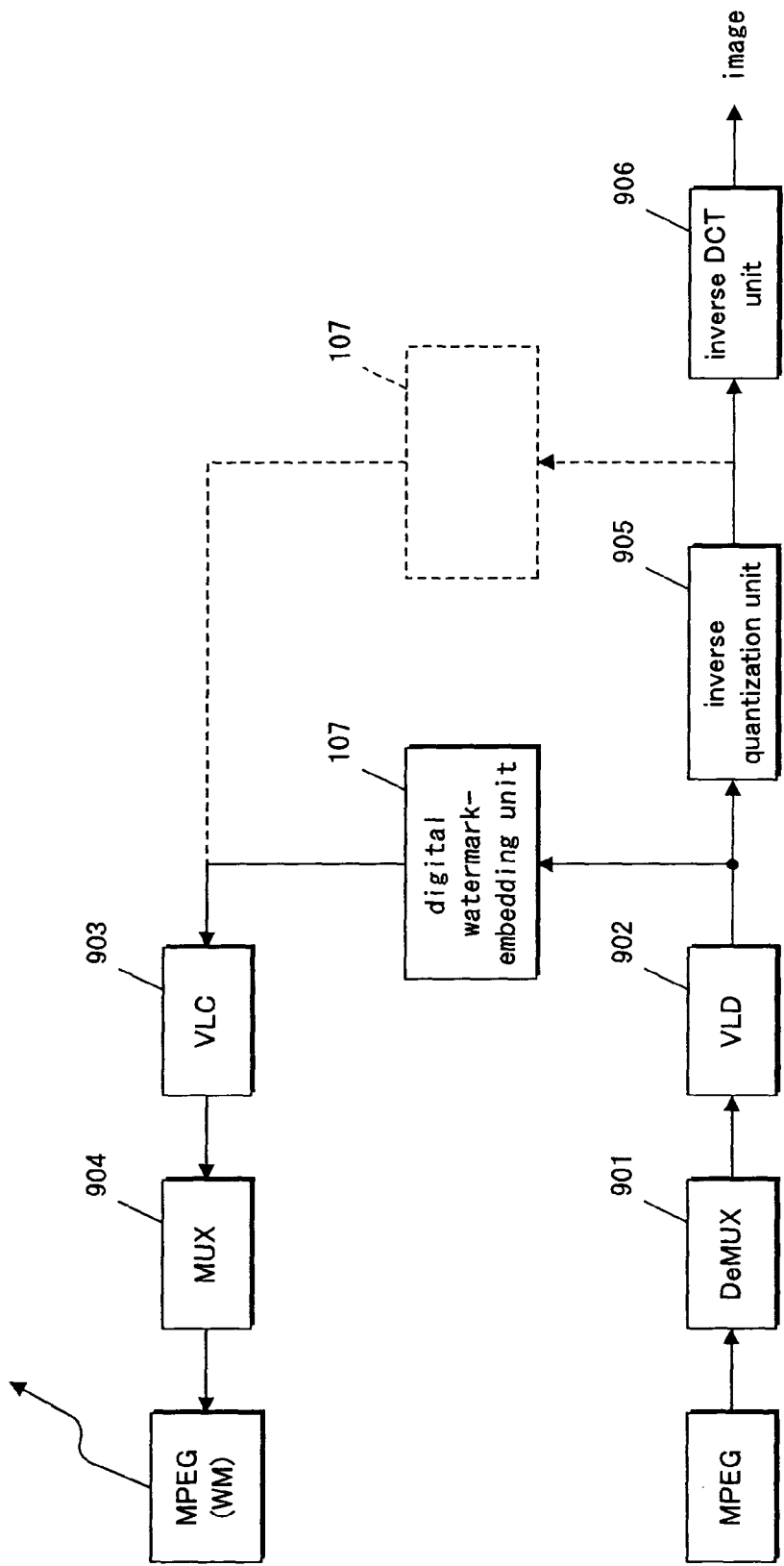
FIG. 9 illustrates an MPEG employed according to the first embodiment.

FIG. 9 illustrates an example in which the digital watermark-embedding apparatus of FIG. 1 is employed in a MPEG system of compressed image data.

As illustrated in FIG. 9, compressed image data of the MPEG system enters a separating unit 901, and the separating unit 901 separates the compressed image data. The separated image data is fed into a variable length-decoding unit 902 from the separating unit 901. The variable length-decoding unit 902 practices the variable length decoding of the separated compressed image, and then feeds DCT coefficient values (frequency components) into the digital watermark-embedding unit 107.

As previously described, the digital watermark-embedding unit 107 embeds digital watermarks into the DCT coefficient values. The DCT coefficient values having the digital watermarks embedded therein are sent to a variable length-encoding unit 903 from the digital watermark-embedding unit 107. The variable length-encoding unit 903 practices the variable length encoding of the DCT coefficient values having the digital watermarks embedded therein. The variable length-encoded DCT values are sent to a multiplexing unit 904.

Figure 18:
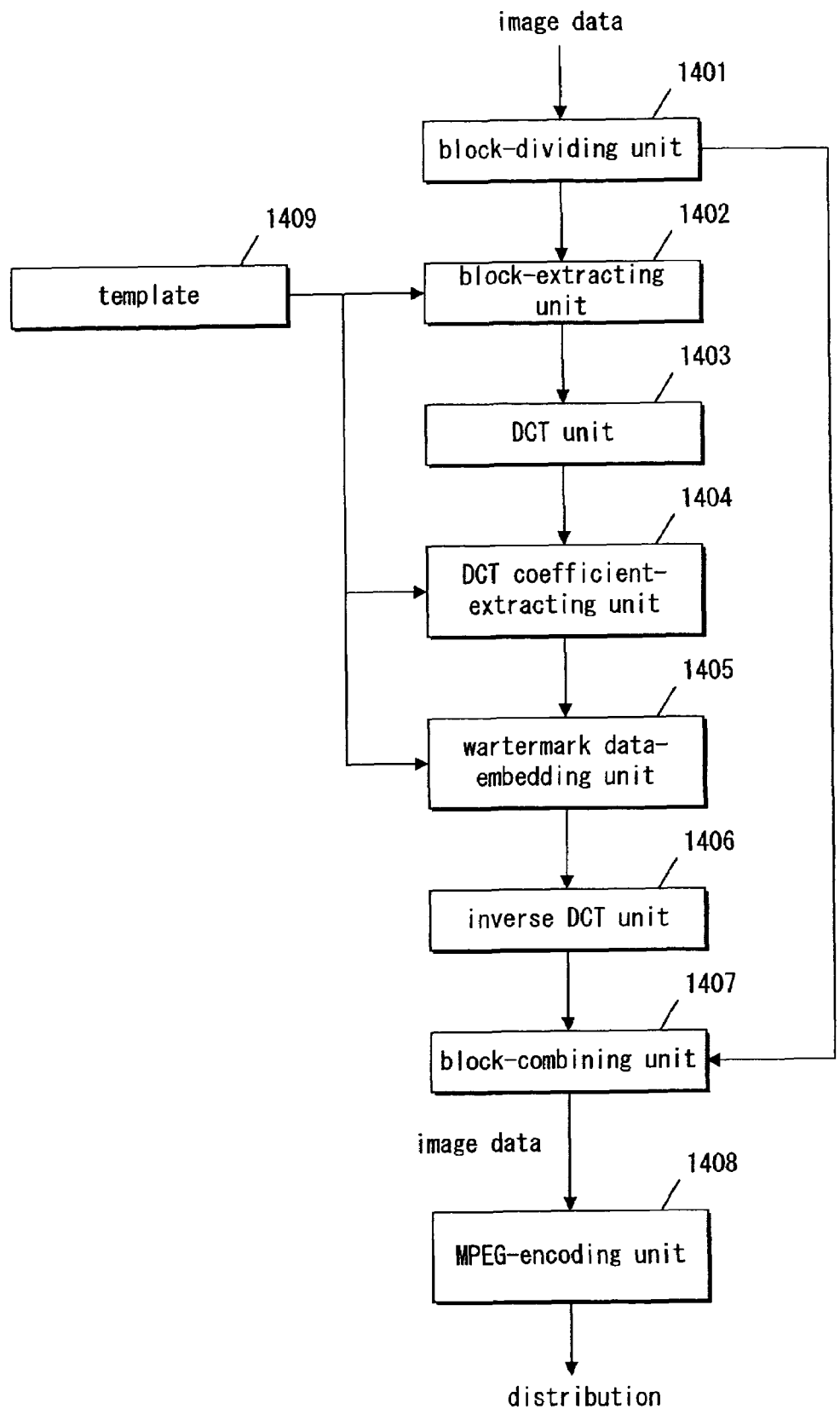
FIG. 18 is a block diagram illustrating a prior art digital watermark-embedding apparatus.

As discussed above, the embedment of the digital watermarks into the DCT coefficients (frequency components) eliminates a series of processes such as inverse DCT encoding, block combining, and encoding from a pixel domain, when compared with the prior art as illustrated in FIG. 18.

As a result, a step of embedding the digital watermarks into MPEG system of compressed image data retained in, e.g., a video server, to deliver the embedded image data to a client provides advantages of a small number of processes, lighter processing loads on the video server, and a good response to the client.

An image of a pixel domain is obtained when an inverse quantization unit 905 inverse-quantizes the output of the variable length-decoding unit 902, and subsequently the inverse DCT unit 906 practices the inverse DCT of the inverse-quantized output. As illustrated by dashed lines in FIG. 9, the digital watermark embedment is allowable immediately after the inverse quantization.

Second Embodiment

A second embodiment is now discussed with reference to the drawings. The present embodiment discuses a digital watermark-detecting apparatus operable to detect digital watermarks from an image signal having the digital watermarks embedded therein by the digital watermark-embedding apparatus as described in the previous embodiment.

Figure 10:
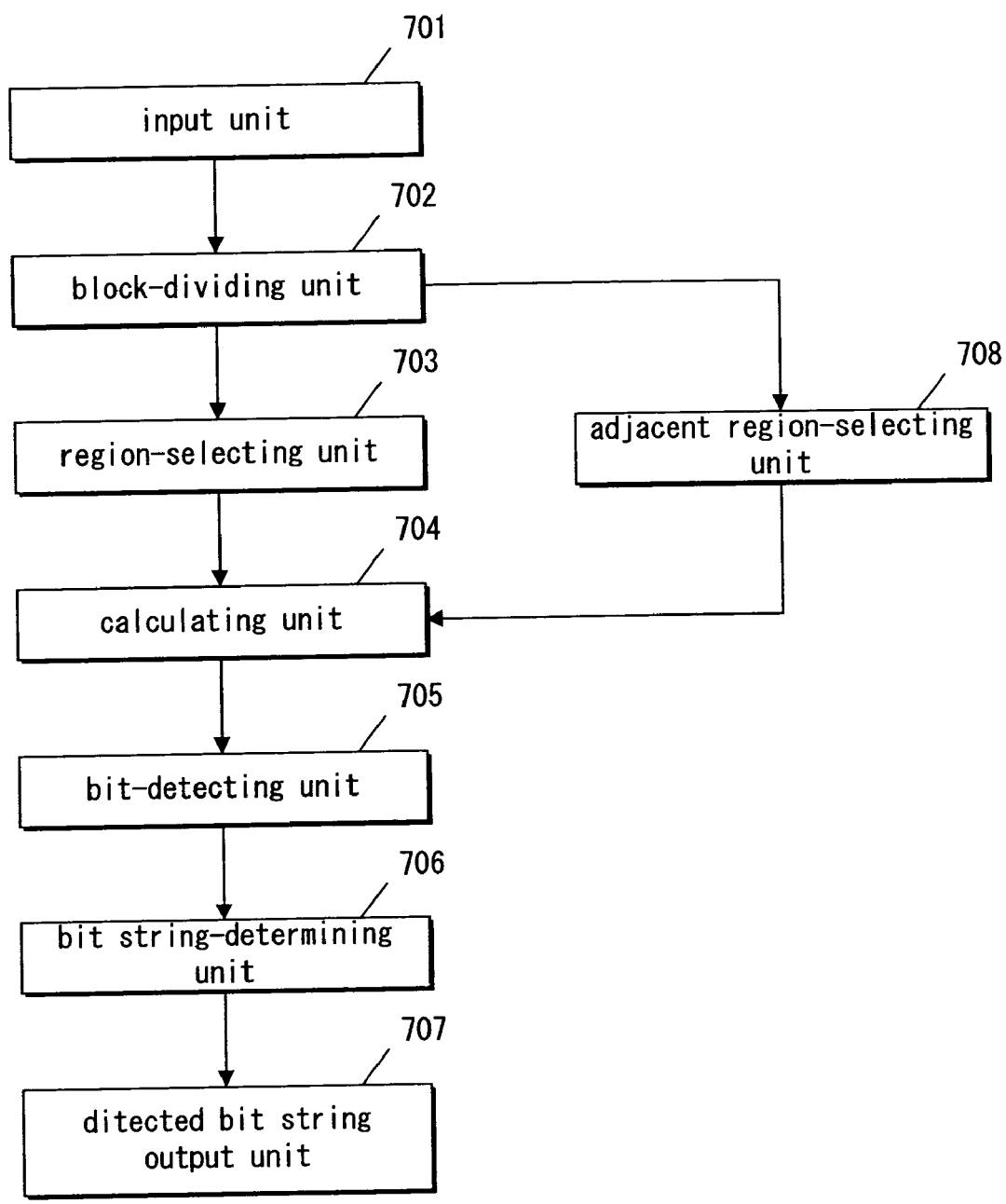
FIG. 10 is a block diagram illustrating a digital watermark-embedding apparatus according to a second embodiment.

FIG. 10 is a block diagram illustrating a structure of the digital watermark-detecting apparatus according to the present embodiment.

In FIG. 10, the digital watermark-detecting apparatus comprises an input unit 701, a block-dividing unit 702, a region-selecting unit 703, a calculating unit 704, a bit-detecting unit 705, a bit string-determining unit 706, a detected bit string output unit 707, and an adjacent region-selecting unit 708

The image signal enters the input unit 701. The block-dividing unit 702 divides the image signal from the input unit 701 into blocks that are formed by several pixels. The region-selecting unit 703 selects regions within the blocks. The calculating unit 704 performs predetermined calculation based on the selected regions.

The bit-detecting unit 705 detects a value of an embedded bit on the basis of an output value from the calculating unit 704. The bit string-determining unit 706 determines an embedded bit string on the basis of the bit value detected by the bit-detecting unit 705.

The detected bit string output unit 707 outputs the bit string determined by the bit string-determining unit 706. The adjacent region-selecting unit 708 selects neighboring regions adjacent to the regions selected by the region-selecting unit 703.

Figure 11:
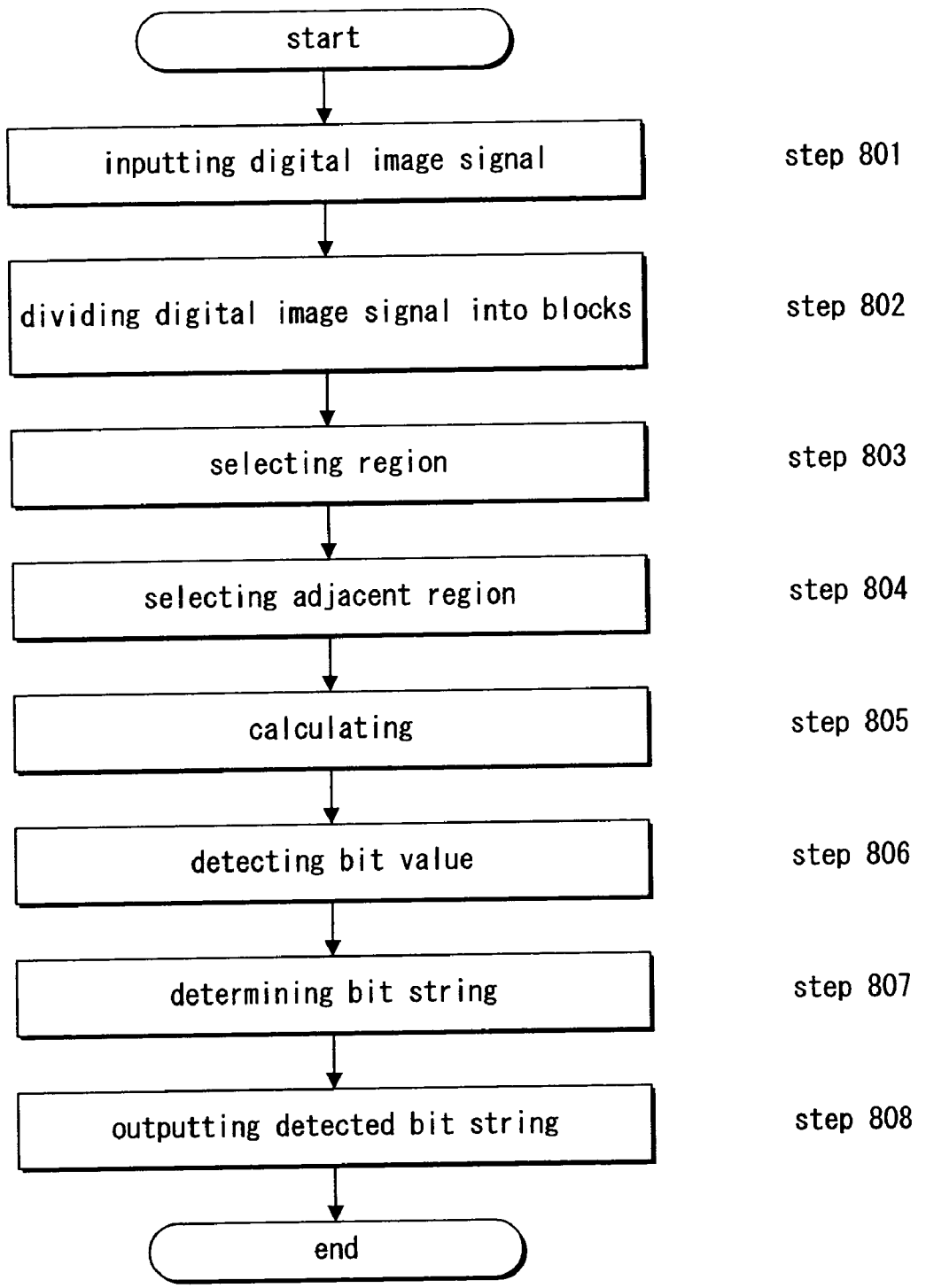
FIG. 11 is a flowchart illustrating how the digital watermark-embedding apparatus behaves.

The digital watermark-detecting apparatus according to the present invention is further discussed with reference to FIG. 11. FIG. 11 is a flowchart illustrating how the digital watermark-detecting apparatus of FIG. 10 behaves.

At step 801, an image signal having digital watermarks embedded therein enters the input unit 701.

At step 802, the block-dividing unit 702 divides the entered image signal into blocks that are formed by several pixels. Pursuant to the present embodiment, the divided blocks are formed by eight-by-eight pixels.

At step 803, the region-selecting unit 703 selects several regions from within the blocks divided at step 802. Each of the regions consists of one or more pixels.

Figure 12:
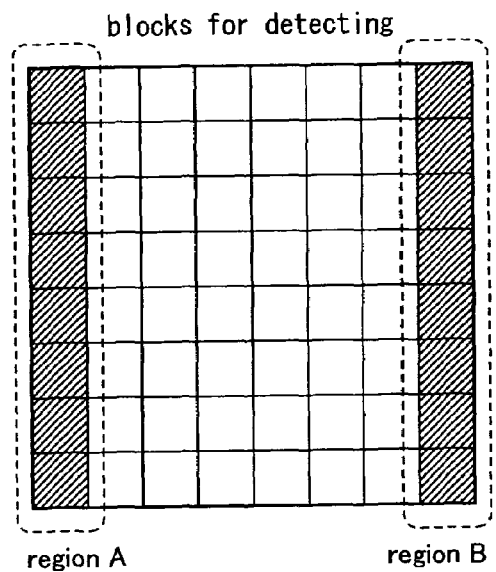
FIG. 12 is a descriptive illustration showing regions selected according to the second embodiment.

FIG. 12 shows how the regions are selected from the blocks of eight-by-eight pixels according to the present steps. In FIG. 12, each rectangle corresponds to a single pixel.

As illustrated in FIG. 12, regions "A" and "B" are selected. In selecting the regions, it is desirable to select pixels that exhibit a high level of digital watermark embedment-caused variations.

The above selection is made in such a manner as to correspond to frequency components fluctuated by the digital watermark-embedding apparatus according to the previous embodiment. As a result, the selected regions are varied according to the frequency components fluctuated in the digital watermark embedment. In this regard, refer to FIGS. 5 to 7.

Referring back to FIG. 11, at step 804, the adjacent region-selecting unit 708 selects several regions adjacent to the regions selected at step 803. Each of such adjacent regions consists of one or more pixels.

Figure 13:
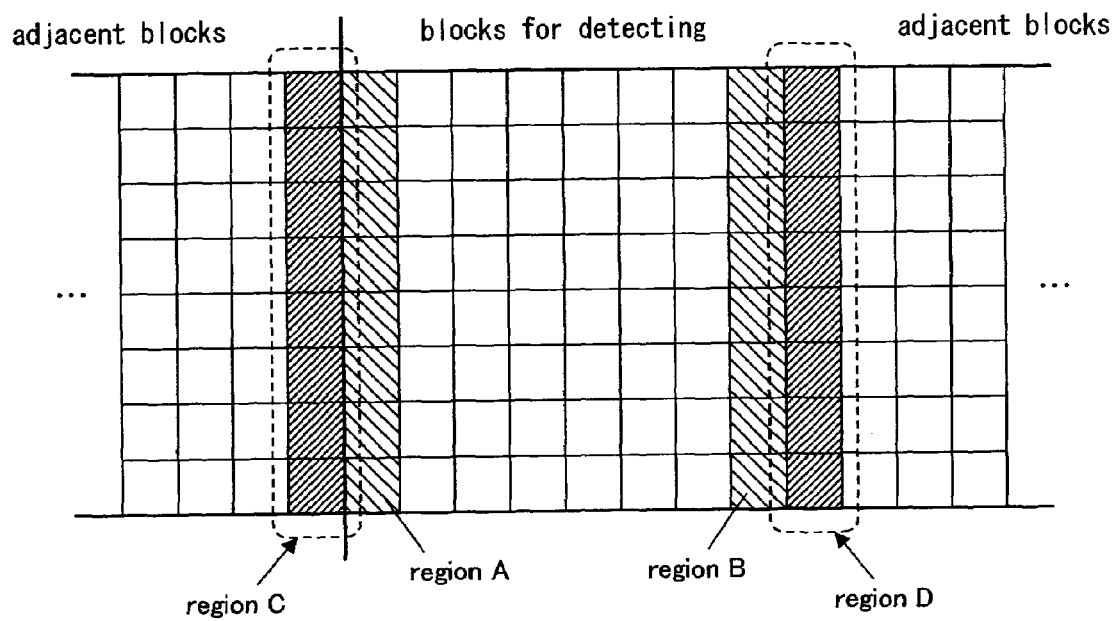
FIG. 13 is a descriptive illustration showing neighboring regions selected according to the second embodiment.

FIG. 13 illustrates how the neighboring regions are selected according to the present steps. In FIG. 13, regions "C" and "D" contiguous to the regions "A" and "B", respectively, are selected.

In selecting the regions "C" and "D", it is desirable to select regions containing pixels that are closest in value to the pixels of the regions "A" and "B" selected at step 803, and that exhibit little variations in response to the digital watermark embedment. According to the present embodiment, the region "C" has the pixels closest in value to those of region "A", while the region "D" has the pixels closest in value to those of the regions "B".

No variations result from the digital watermark embedment because a bit string to be embedded is allocated to every other block using the digital watermark-embedding apparatus according to the previous embodiment.

At step 805, the calculating unit 704 performs predetermined calculation of the regions selected at steps 803 and 804. Assume that the selected regions "A", "B", "C", and "D" have the pixels summing up to sumA, sumB, sumC, and sumD, respectively. In this instance, an output value is equal to (sumA−sumC)−(sumB−sumD).

Alternatively, "sumA−sumB" may be taken as an output value to detect digital watermarks. However, this alternative is likely to detect the digital watermarks with poor precision, depending upon how the pixels within the blocks are varied in value. In view of the above, sumC and sumD of the regions "C" and "D" having the pixels close in value to those of the regions "A" and "B" respectively are subtracted from sumA and sumB, respectively. As a result, only variations caused by the digital watermark embedment are operatively extractable.

At step 806, the embedded bit is detected according to the output value in step 805 to determine that the embedded bit has values of "0" or "1". When the output value in step 805 is positive, then the bit value is "1". When the output value in step 805 is negative, then the bit value is "0".

At step 807, the bit string-determining unit 706 determines the embedded bit string on the basis of the bit values detected at step 806. The bit string-determining unit 706 arranges in sequence the values detected for each of the blocks at step 806, thereby forming a bit string.

The digital watermark-embedding apparatus according to the previous embodiment embeds the bit string repeatedly. Accordingly, the bit string circulating within an image frame is detectable. The values in the bit string are determined by majority decision in accordance with the repeatedly detected bit string.

At step 808, the detected bit string output unit 707 outputs the bit string determined at step 807.

As described above, the digital watermark-embedding apparatus according to the present embodiment performs calculations after selecting a region having a high level of digital watermark embedment-caused variations and an adjacent region having pixels close in value to pixels of the former region, in which no digital watermark embodiment-caused variations occur in the adjacent region. As a result, only digital watermark embedment-caused variations are effectively extractable. A digital watermarking art immune to a block image and designed to detect digital watermarks with high precision is achievable.

Pursuant to the present embodiment, a total of pixel values within each of the regions are determined at step 805 to calculate differences in pixel value between the regions. Alternatively, an average of pixel values within each of the regions is acceptable. As a further alternative to the simple total of pixel values, the pixel values may be weighted according to amounts of variations in pixels in response to the digital watermark embedment.

Pursuant to the present embodiment, at steps 803 and 804, the regions are selected from the present frame image where blocks to be detected are present. In addition thereto, the regions may be selected in sequence of regeneration from the previous frame, the subsequent frame, or both of them. This alternative provides further pronounced detection of digital watermarks. In this instance, it is desirable to select, from the previous frame or subsequent frame, blocks nearest in image to the blocks to be detected.

Third Embodiment

A third embodiment is now described with the drawings. A digital watermark-embedding apparatus according to the present embodiment differs in only step 201 (see FIG. 2) from that according to the first embodiment. The embedment signal-generating unit 101 (see FIG. 1) takes step 21. Therefore, the present embodiment discusses only an embedment signal-generating unit 101.

The embedment signal-generating unit 101 selects a pseudo-random number sequence that corresponds to embedment information, with reference to a reference table in which the previously prepared embedment information is related to pseudo-random number sequences. The embedment signal-generating unit 101 generates an embedment signal from the selected pseudo-random number sequence. Each bit of the generated embedment signal is allocated to one of the blocks.

The present embodiment employs a reference table having the pseudo-random number sequences related to a position and values of each bit that forms a binary bit string transformed from the embedment information. The embedment information is transformed into the binary bit string in a manner identical to the first embodiment.

A subsequent process is now discussed with reference to FIG. 14. FIG. 14 (*a*) illustrates the binary bit string transformed from the embedment information and bit positions of the binary bit string. FIG. 14 (*b*) illustrates the reference table in which each of the pseudo-random number sequences is related to a corresponding bit position and values.

The embedment signal-generating unit 101 selects the pseudo-random number sequences according to the reference table sequentially from the head of the bit string. For example, as seen from FIG. 14 (*a*), bit position {0} corresponds to a bit having value {0}. Accordingly, as illustrated in FIG. 14 (*b*), pseudo-random number {S000} is selected. As a result, each bit of pseudo-random number {S000} is allocated to one of the blocks.

As described above, the bit string of the embedment information is related to the pseudo-random number sequences to perform digital watermark embedment.

The present embodiment uses the reference table having the pseudo-random number sequences related to the bit position and values of each bit that forms the binary bit string transformed from the embedment information. An alternative reference table may be used, in which each of the pseudo-random number sequences is related to a corresponding bit position and values for every several bits of the embedment information. As a further alternative, as long as any reference table designed to uniquely determine corresponding embedment information from each of the pseudo-random number sequences is available, the present invention is not limited to the reference table as already discussed. All that is required is that the digital watermark-embedding apparatus and the digital watermark-detecting apparatus may share the reference table.

Fourth Embodiment

A fourth embodiment is now discussed with reference to the drawings. The present embodiment discusses a digital watermark-detecting apparatus operable to detect digital watermarks from an image signal having the digital watermarks embedded therein by the digital watermark-embedding apparatus according to the third embodiment.

Figure 15:
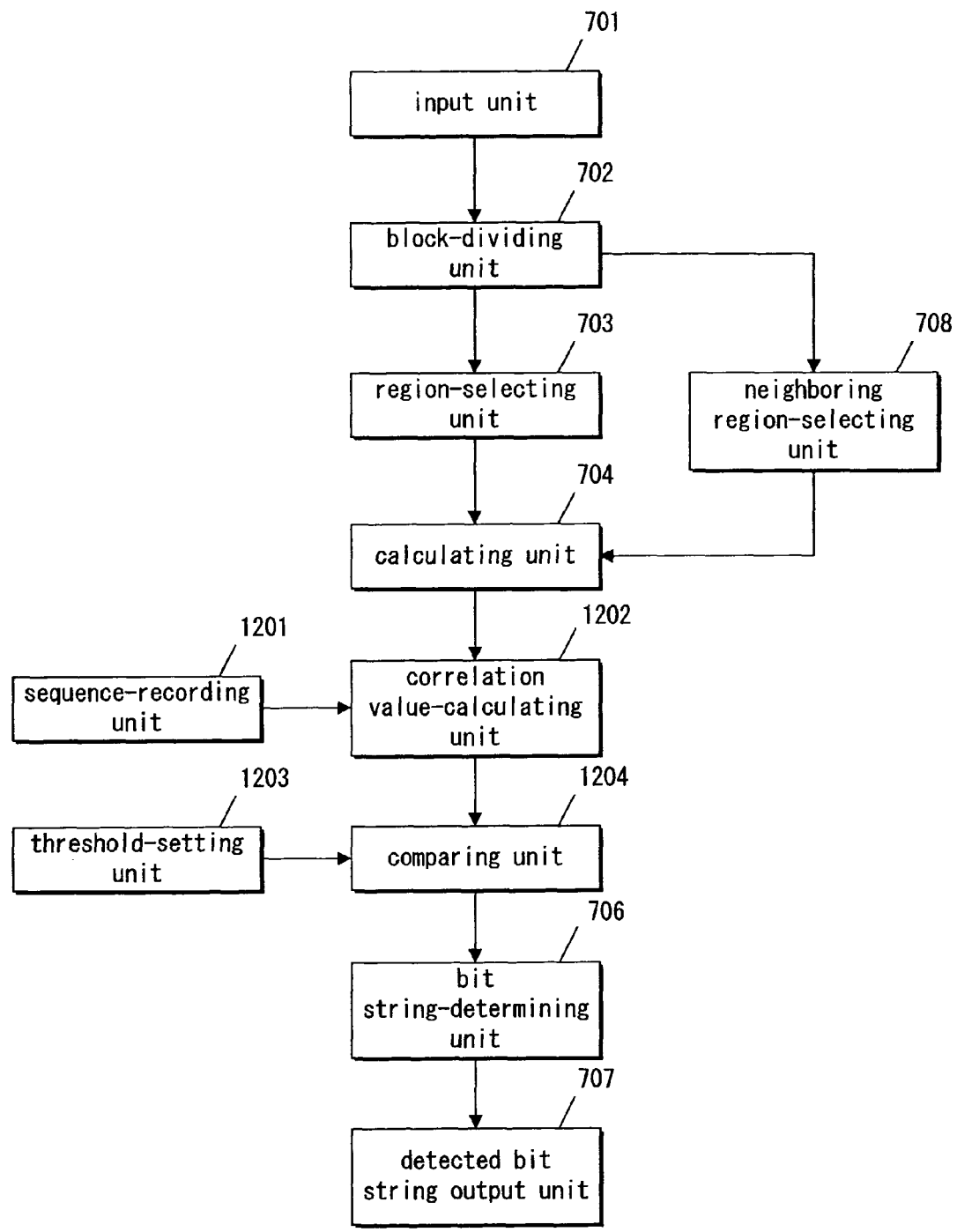
FIG. 15 is a block diagram illustrating a digital watermark-embedding apparatus according to a fourth embodiment.

FIG. 15 is a block diagram illustrating the digital watermark-detecting apparatus according to the present embodiment.

In FIG. 15, the digital watermark-detecting apparatus comprises an input unit 701, a block-dividing unit 702, a region-selecting unit 703, a calculating unit 704, a sequence-recording unit 1201, a correlation value-calculating unit 1202, a threshold-setting unit 1203, a comparing unit 1204, a bit string-determining unit 706, a detected bit string output unit 707, and an adjacent region-selecting unit 708.

The sequence-recording unit 1201 retains a reference table in which each piece of embedment information is related to a pseudo-random number sequence.

The correlation value-calculating unit 1202 calculates values correlated between a sequence of output values calculated by the calculating unit 704 for each block and the pseudo-random number sequences included in the reference table, and then feeds the maximum of the obtained correlation values into the comparing unit 1204.

The threshold-setting unit 1203 sets up a threshold of the correlation value. The comparing unit 1204 compares the maximum correlation value from the correlation value-calculating unit 1202 with the threshold from the threshold-setting unit 1203, thereby providing a pseudo-random number sequence met by results from the comparison. The pseudo-random number sequence is sent to the bit string-determining unit 706.

The bit string-determining unit 706 determines a bit string to be embedded, on the basis of the pseudo-random number sequence from the comparing unit 1204 and the reference table. The detected bit string output unit 707 outputs the bit string determined by the bit string-determining unit 706.

The digital watermark-detecting apparatus according to the present embodiment is further discussed with reference to FIG. 16.

Figure 16:
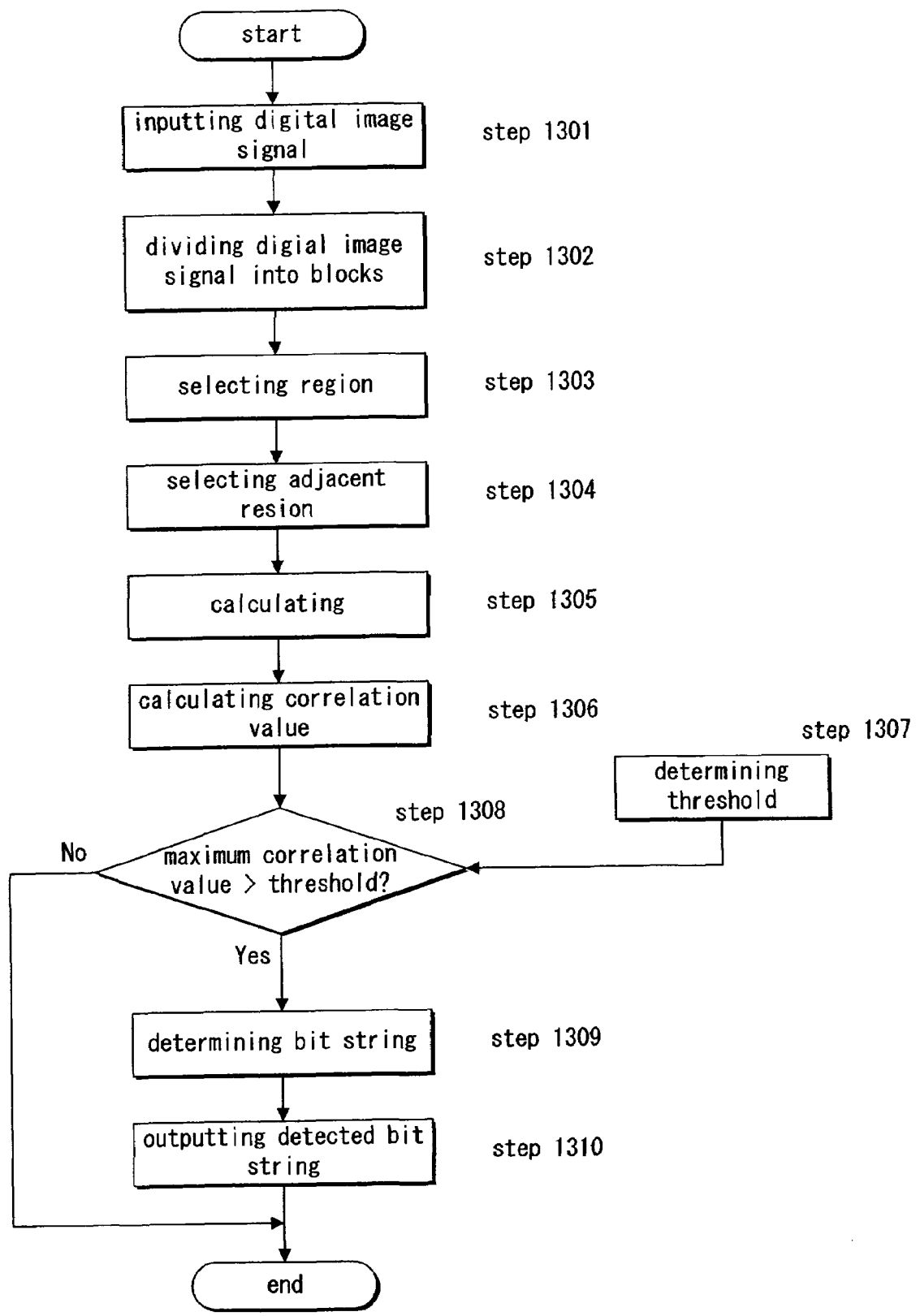
FIG. 16 is a flowchart illustrating how the digital watermark-embedding apparatus behaves.

FIG. 16 is a flowchart illustrating how the digital watermark-detecting apparatus of FIG. 15 behaves.

At step 1301, an image signal having digital watermarks embedded therein enters the input unit 701.

At step 1302, the block-dividing unit 702 divides the image signal into blocks that are formed by several pixels. Pursuant to the present embodiment, the divided blocks are formed by eight-by-eight pixels.

At step 1303, the region-selecting unit 703 selects several regions from within the divided blocks. The several regions consist of one or more pixels. Since step 1303 is identical to step 803 (see FIG. 11) according to the second embodiment, descriptions related thereto are omitted.

At step 1304, the adjacent region-selecting unit 708 selects several regions adjacent to the regions selected at step 1303. The adjacent regions consist of one or more pixels. Since step 1304 is identical to step 804 (see FIG. 11) according to the second embodiment, descriptions related thereto are omitted.

At step 1305, the calculating unit 704 performs predetermined calculation of the regions selected at steps 1303 and 1304. Since step 1305 is identical to step 805 (see FIG. 11) according to the second embodiment, descriptions related thereto are omitted.

The sequence-recording unit 1201 records the same content as the reference table having the pseudo-random number sequence related to embedment information according to the third embodiment.

At 1306, the correlation value-calculating unit 1202 calculates values correlated between a sequence of output values calculated for each of the blocks at step 1305 and all of the pseudo-random number sequences in the reference table recorded by the sequence-recording unit 1201, and then determines the maximum from among the calculated correlation values. The correlation value-calculating unit 1202 feeds, into the comparing unit 1204, the maximum correlation value and one of the pseudo-random number sequences, which provides such a correlation.

Referring to the reference table of FIG. 14 (*b*), the correlation value-calculating unit 1202 determines values correlated between thirty-two pseudo-random number sequences {S000, S001 through S151} and a sequence of output values calculated for each of the blocks, and then determines the maximum from among the determined correlation values. When maximum correlation value SMAX is obtained from a correlation with pseudo-random number sequence {S000}, maximum correlation value SMAX and pseudo-random number sequence {S000} are sent to the comparing unit 1204.

At step 1307, the threshold-setting unit 1203 sets up a threshold for the comparing unit 1204. At step 1308, the comparing unit 1204 compares the maximum correlation value with the threshold. When the correlation value is greater than the threshold, then a bit position corresponding to the pseudo-random number sequence that provides the maximum correlation value, and values of the bit position are sent to the bit string-determining unit 706. Referring to the reference table of FIG. 14 (*b*), bit position {0} corresponding to pseudo-random number sequence {S000}, and value {0} of bit position {0} are sent to the bit string-determining unit 706. No processing is made when the maximum correlation value is less than the threshold.

When illegal reproduction causes disturbances, there are cases where correlation values greater than the threshold may be all absent, or where several correlation values greater than the threshold may exist. In this instance, the comparing unit 1204 takes an exceptional step, not comparing the threshold with the correlation value. More specifically, only when maximum correlation value "S1" is related to other correlation values "Sn" under a certain condition (e.g., S1>Sn), then the comparing unit 1204 may determine a bit position corresponding to a pseudo-random number sequence that provides maximum correlation value "S1", and values of the bit position.

At step 1309, the bit string-determining unit 706 retains the bit position and values thereof from the comparing unit 1204, and then forms a bit string when all bit positions of an embedded bit string and values of the bit positions are fully provided. The formed bit string is sent to the detected bit string output unit 707.

At step 1310, the detected bit string output unit 707 outputs the bit string determined at step 1309.

As described above, the digital watermark-detecting apparatus according to the present embodiment detects embedded digital watermarks on the basis of a correlation with a pseudo-random number sequence related to an embedment signal, and consequently provides higher-reliable detection when compared with a method of simply detecting a bit string.

The first to fourth embodiments have been discussed as above.

Figure 17:
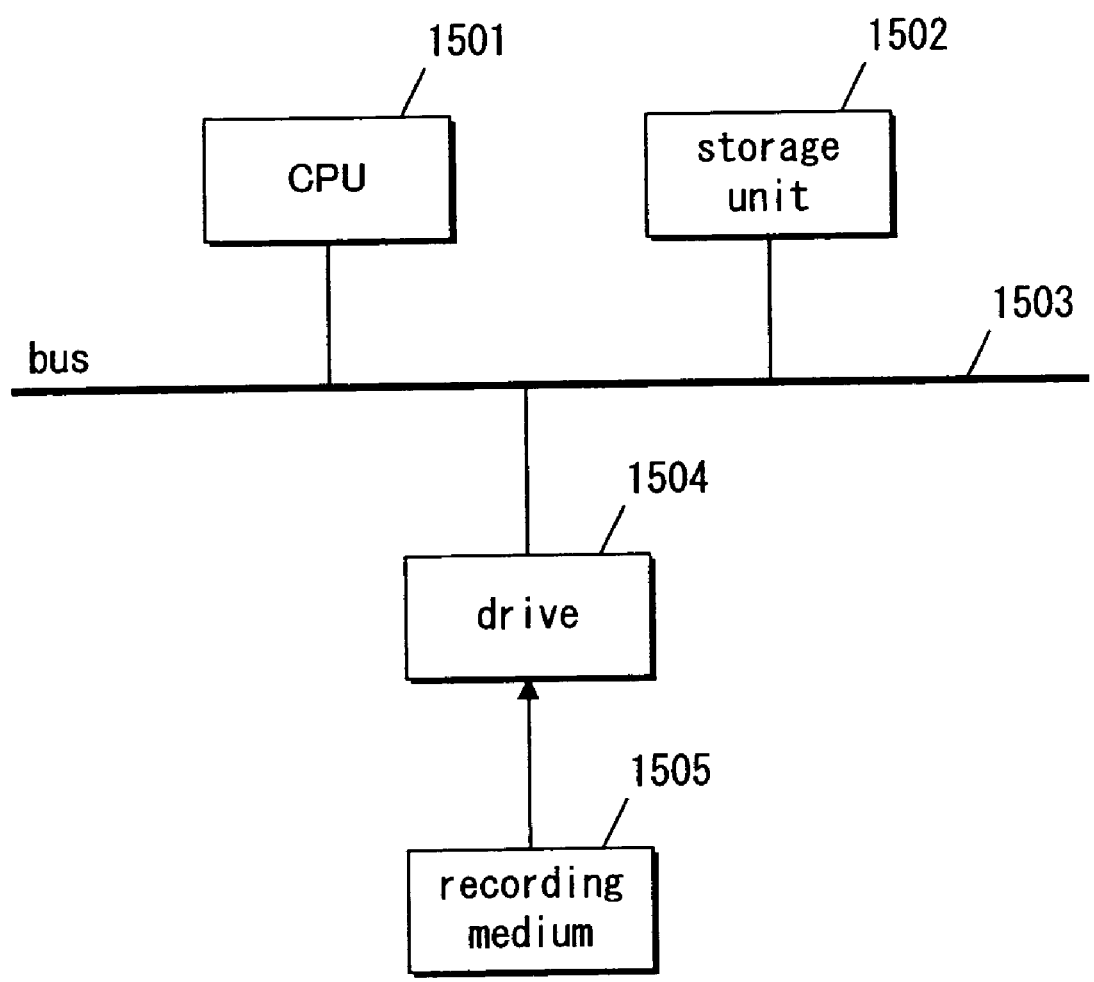
FIG. 17 is a descriptive illustration showing a recording medium having programs recorded therein according to the present invention.

Typically, as shown in FIG. 17, the digital watermark-embedding apparatus and digital watermark-detecting apparatus according to the first to fourth embodiments provide features achieved by a storage unit 1502 (ROM, RAM, hard disk, etc.) and a CPU 1501 (central processing unit). The storage unit 1502 is operable to contain a digital watermark-embedding program and a digital watermark-detecting program. The CPU 1501 is operable to execute such program data. The digital watermark-embedding program and digital watermark-detecting program are contained in a recording media 1505 such as a CD-ROM and a floppy disk, and are then loaded or installed into the storage unit 1502 from the recording medium 1505.

The present invention selects one or more frequency components on the basis of a first characteristic amount extracted from several frequency components, and then operates values of the selected one or more frequency components under a predetermined rule. This feature suppresses degradation in image quality. The present invention extracts a second characteristic amount from several frequency components that has experienced orthogonal transform, and then embeds digital watermarks into the frequency components in accordance with the second characteristic amount. This feature further suppresses the degradation in image quality.

The present invention requires a small amount of processing. The present invention operates, under a predetermined rule, values of one or more frequency components that have experienced discrete cosine transform. This feature realizes digital watermark embedment having a high affinity for standard image encoding represented by MPEG-encoding using the discrete cosine transform.

The present invention performs calculations after selecting a region having a high level of digital watermark embedment-caused variations, and a neighboring region adjacent to the former region and close in pixel value to the former region, in which no digital watermark embedment-caused variations occur in the neighboring region. This feature operatively extracts only variations caused by digital watermark embedment, and realizes a digital-watermarking art having high-detective precision.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital watermark-embedding apparatus comprising:
    an embedment signal-generating unit operable to generate an embedment signal in accordance with embedment information, the embedment signal being embedded as a digital watermark;
    a block-dividing unit operable to divide a digital image signal into blocks that are formed by several pixels;
    an orthogonal transform unit operable to practice orthogonal transformation of each of the blocks, thereby transforming the blocks into several frequency components;
    a digital watermark-embedding unit operable to operate, under a predetermined rule, a value of at least one of the several frequency components in accordance with the embedment signal generated by said embedment signal-generating unit, in which the value is operated in such a manner that amounts of variations in image within the blocks follow a predetermined specific pattern in consideration of detection;
    a first characteristic amount-extracting unit operable to extract a first characteristic amount in accordance with the several frequency components; and
    a selecting unit operable to select a value of at least one of the several frequency components in accordance with the extracted first characteristic amount;
    wherein the specific pattern has two different regions arranged in alternating sequence, one of the two different regions being where the amounts of variations in image serve as positive, and the other region being where the amounts of variations in image serve as negative; and
    wherein the first characteristic amount is a combination of one or more frequency components selected from a total of specific frequency components corresponding to vertical edges in an image within the blocks, a total of specific frequency components corresponding to horizontal edges therein, and a total of specific frequency components corresponding to slanted edges therein.

2. A digital watermark-embedding apparatus as defined in claim 1, wherein the embedment signal-generating unit transforms the embedment information into a binary bit string, and uses the binary bit string as the embedment signal.

3. A digital watermark-embedding apparatus as defined in claim 1, wherein said embedment signal-generating unit selects a pseudo-random number sequence corresponding to the embedment information, with reference to a reference table having pseudo-random number sequences related to previously prepared embedment information, and uses the selected pseudo-random number sequence as the embedment signal.

4. A digital watermark-embedding apparatus as defined in claim 1, wherein said first characteristic amount-extracting unit extracts the first characteristic amount in accordance with several frequency components in the blocks and several frequency components in neighboring blocks positioned adjacent to the former blocks.

5. A digital watermark-embedding apparatus as defined in claim 1, wherein said selecting unit determines, in accordance with the first characteristic amount, which one of the vertical edges, the horizontal edges, and the slanted edges is dominant in the image within the blocks, and selects at least one of the several frequency components in accordance with results from the determination.

6. A digital watermark-embedding apparatus as defined in claim 1, wherein said digital watermark-embedding unit operates the value in order to fluctuate the value.

7. A digital watermark-embedding apparatus as defined in claim 6, further comprising:
    a second characteristic-extracting unit operable to extract a second characteristic amount from the several frequency components,
    wherein said digital watermark-embedding unit changes, in accordance with the extracted second characteristic amount, magnitude at which the value is fluctuated.

8. A digital watermark-embedding apparatus as defined in claim 7, wherein the several frequency components include a direct current component value and a specific alternating current component value, and wherein the second characteristic amount is either one of the direct current component value and the specific alternating current component value or both.

9. A digital watermark-embedding apparatus as defined in claim 1, wherein said orthogonal transform unit performs a discrete cosine transform.

10. A digital watermark-embedding apparatus as defined in claim 9, wherein the specific pattern includes a pattern represented by a base image in the discrete cosine transform.

11. A digital watermark-embedding method comprising:
    generating an embedment signal in accordance with embedment information, the embedment signal being embedded as a digital watermark;
    dividing a digital image signal into blocks that are formed by several pixels;
    practicing orthogonal transformation of each of the blocks, thereby transforming the blocks into several frequency components;
    operating, under a predetermined rule, a value of at least one of the several frequency components in accordance with the embedment signal obtained by the generating the embedment signal, in which the value is operated in such a manner that amounts of variations in image within the blocks follow a predetermined specific pattern in consideration of detection; and
    extracting a first characteristic amount in accordance with the several frequency components; and
    selecting at least one of the several frequency components in accordance with the extracted first characteristic amount;
    wherein the specific pattern has two different regions arranged in alternating sequence, one of the two different regions being where the amounts of variations in image serve as positive, and the other region being where the amounts of variations in image serve as negative; and
    wherein the first characteristic amount is a combination of one or more frequency components selected from a total of specific frequency components corresponding to vertical edges in an image within the blocks, a total of specific frequency components corresponding to horizontal edges therein, and a total of specific frequency components corresponding to slanted edges therein.

12. A digital watermark-embedding method as defined in claim 11, wherein said generating the embedment signal comprises transforming the embedment information into a binary bit string, and using the transformed binary bit string as the embedment signal.

13. A digital watermark-embedding method as defined in claim 11, wherein said generating the embedment signal comprises selecting a pseudo-random number sequence corresponding to the embedment information, with reference to a reference table having pseudo-random number sequences related to previously prepared embedment information, and using the selected pseudo-random number sequence as the embedment signal.

14. A digital watermark-embedding method as defined in claim 11, wherein said extracting the first characteristic amount comprises extracting the first characteristic amount in accordance with several frequency components in the blocks and several frequency components in neighboring blocks positioned adjacent to the former blocks.

15. A digital watermark-embedding method as defined in claim 11, wherein said selecting at least one of the several frequency components comprises determining, in accordance with the extracted first characteristic amount, which one of the vertical edges, the horizontal edges, and the slanted edges is dominant in the image within the blocks, and selecting at least one of the several frequency components in accordance with results from the determination.

16. A digital watermark-embedding method as defined in claim 11, wherein said operating the value under the predetermined rule is to fluctuate the value.

17. A digital watermark-embedding method as defined in claim 16, further comprising:
extracting a second characteristic amount from the several frequency components,
wherein said operating the value under the predetermined rule comprises changing, in accordance with the extracted second characteristic amount, magnitude at which the value is fluctuated.

18. A digital watermark-embedding method as defined in claim 17, wherein the several frequency components include a direct current component value and a specific alternating current component value, and wherein the second characteristic amount is either one of the direct current component value and the specific alternating current component value or both.

19. A digital watermark-embedding method as defined in claim 11, wherein said practicing the orthogonal transformation comprises performing a discrete cosine transform.

20. A digital watermark-embedding method as defined in claim 19, wherein the specific pattern includes a pattern represented by a base image in the discrete cosine transform.

* * * * *